United States Patent [19]

Ogata et al.

[11] Patent Number: 4,575,839

[45] Date of Patent: Mar. 11, 1986

[54] CENTRALIZED SUPERVISORY SYSTEM

[75] Inventors: Yusuke Ogata; Yasushi Nagahama, both of Yokohama; Yoshiaki Matsuura; Kenzou Aoki, both of Kawasaki; Hidemi Harada, Oyama, all of Japan

[73] Assignee: Fujitsu Limited, Kawasaki, Japan

[21] Appl. No.: 462,111

[22] Filed: Jan. 28, 1983

[30] Foreign Application Priority Data

Jan. 29, 1982 [JP] Japan ............................... 57-012990

[51] Int. Cl.[4] ...................... H04Q 11/04; H04M 3/22
[52] U.S. Cl. ...................................... 370/13; 370/58; 179/175.2 C
[58] Field of Search .................. 370/13, 17, 110.1, 58; 179/125.2 R, 175.2 C, 175.3 F

[56] References Cited

U.S. PATENT DOCUMENTS

| | | | |
|---|---|---|---|
| 3,851,121 | 11/1974 | Marvin | 179/175.2 C |
| 3,909,561 | 10/1975 | Dent | 179/175.2 C |
| 3,980,839 | 9/1976 | Hutcheson | 179/175.2 R |
| 4,232,386 | 11/1980 | McDonald et al. | 370/110.1 |
| 4,322,843 | 3/1982 | Beuscher et al. | 370/58 |
| 4,424,421 | 1/1984 | Townsend et al. | 179/175.2 R |

FOREIGN PATENT DOCUMENTS 2713937 9/1978 Fed. Rep. of Germany .
2010048 6/1979 United Kingdom .

OTHER PUBLICATIONS

European Patent EP-A-O 006 134, filed 09.01.80, Siemens Aktiengesellschaft.
Patent Abstracts of Japan, vol. 3, No. 98(E-131), Aug. 18th, 1979, p. 43 E 131.
Ericsson Review, vol. 56, No. 3, 1979, pp. 104,115, Stockholm.
International Conference on Communications, vol. 2, Jun. 10th-14th, 1979, pp. 12.6.1-12.6.5, Boston, T. Nakayama et al., "A Big Switching Network Composed of Tiny Electronic Switching Units.
N.E.C. Research and Development, No. 64, Jan. 1982, pp. 86-92, Tokyo, Japan, A. Kitamura et al., "NEAX 61 Digital Remote Switching System".
IEEE Transactions on Communications, vol. COM-30, No. 6, Jun. 1982, pp. 1386-1392, New York, H. J. Beuscher, "No. 5 ESS Maintenance Software".
Electrical Communication, vol. 56, No. 2/3, 1981, pp. 218-234, New York, M. Van Brussel et al., "ITT1240 Digital Exchange Application to the Local Network".
GEC Journal of Science & Technology, Vo. 44, No. 1, 1977, pp. 22-30, Wembley (GB); D. M. Leakey, "Computer-controlled Digital Telephone Switching Systems".
Telephone Report Siemens, vol. 3, No. 4, Aug. 1980, pp. 338-343, Munchen, Germany; J. Schrader et al., "Wartungsdatensammelsystem fur offentliche Telefonvermittlungen".
European Search Report, Examiner J. C. J. Gerling, 4-5-83, The Hague.

*Primary Examiner*—Douglas W. Olms
*Assistant Examiner*—Frank M. Scutch, III
*Attorney, Agent, or Firm*—Staas & Halsey

[57] ABSTRACT

A centralized supervisory system in an automatic switching system including at least one remote office with a first time-division switching system and a first supervisory unit, and a central office with a second time-division switching system and a second supervisory unit. The first time-division switching system and the second time-division switching system being connected by a time-division multichannel line. Supervisory data output from the first supervisory unit are allocated to one or more predetermined channels on the time-division multichannel line, so that the supervisory data output from the first supervisory unit are transferred through the time-division multichannel line to the second supervisory unit and are centrally supervised therein.

7 Claims, 11 Drawing Figures

CENTRALIZED SUPERVISORY SYSTEM

BACKGROUND OF THE INVENTION

1. Field of the Invention

The present invention relates to a centralized supervisory system and, more particularly, to a centralized supervisory system in an automatic switching system comprising of a plurality of remote offices and a central office. In the automatic switching system to which the present invention pertains, each remote office has a remote-office time-division switching system centrally supervised by the central office. The central office has a central office time-division switching system connected through pulse-code modulation (PCM) multichannel lines to the remote-office time-division switching systems.

2. Description of the Prior Art

Conventionally, space-division switching systems have been employed in the remote offices and in the central office. In one such conventional system, the remote-office space-division switching systems and the central-office space-division switching system have been connected by the number of wired transmission lines corresponding to the volume of calls carried. That is, the transmission lines have not been multichannel, but single channel or single telephone subscriber lines.

In another such conventional system, the remote offices and the central office have been connected by a single analog multichannel line, but even here the output signals of each space-division switching system have been first provided on a number of separate transmission lines and then multiplexed on the single analog multichannel line and/or the signals on the single analog multichannel line have been divided from each other and then supplied through a number of transmission lines to the space-division switching systems. Therefore, even though single analog multichannels are employed, the remote offices and the central office can still be said to have been connected by a number of transmission lines each corresponding to single channels.

In the conventional systems mentioned above where the remote offices and the central office are connected by a number of transmission lines each corresponding to single channels, it was relatively easy to use some of the transmission lines especially for transferring supervisory data from the remote offices to the central office.

Recent technology, however, has led to the development of time-division switching systems in place of space-division switching systems. When time-division switching systems are employed in both the remote offices and the central office, the connections therebetween are realized by a single PCM multichannel line for time-division multiplexed lines. The use of PCM multichannels, however, makes it difficult to use some of the channels especially for transmitting data from the remote offices to the central office.

Instead of using some of the channels especially for transmitting supervisory data, separate transmission lines may be provided for supervisory data, independent from the PCM multichannel line. It is obvious, however, that the provision of separate transmission lines would incur unwarranted additional expenses.

SUMMARY OF THE INVENTION

Accordingly, it is an object of the present invention to provide a centralized supervisory system in which lines for transferring supervisory data are economically realized by utilizing some of the channels on time-division multiplexed lines connected between remote offices and a central office.

In accordance with the present invention, there is provided a centralized supervisory system in an automatic switching system, comprising: at least one remote office having a remote-office time-division switching system and a remote-office supervisory unit for supervising the system status of the remote-office time-division switching system; at least one first time-division multichannel line; a central office having a central office time-division switching system, connected through the first time-division multichannel line to the at least one remote office, and a central supervisory unit for receiving supervisory data from the remote-office supervisory unit of the at least one remote office and for centrally supervising the received supervisory data; first means for allocating the supervisory data from the remote-office supervisory unit of the at least one remote office to one or more predetermined channels on the first time-division multichannel line; and second means for connecting predetermined output signal lines of the central-office time-division switching system to the central supervisory unit, the predetermined output signal lines transferring the supervisory data output from the central-office time-division switching system.

BRIEF DESCRIPTION OF THE DRAWINGS

The above object and advantage as well as other features of the present invention will become more apparent from the following description with reference to the accompanying drawings, wherein.

DESCRIPTION OF THE PREFERRED EMBODIMENTS

The present invention will now be described in more detail with reference to examples of conventional systems and preferred embodiments.

Figure 1:
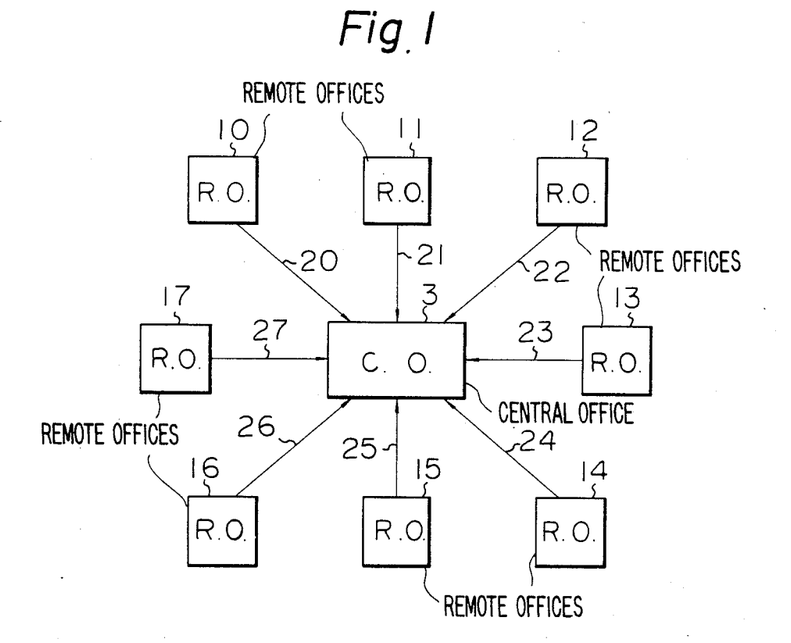
FIG. 1 is a block diagram of an example of a centralized supervisory system for explaining the background of the present invention.

FIG. 1 shows a central supervisory system for explaining the background of the present invention. In FIG. 1, a number of remote offices (R.O.) 10 through 17 are connected through data-transmitting lines 20 through 27, respectively, to a single central office (C.O.) 3. Each of the remote offices is unmanned by a maintenance operator at least during the night. Instead, each remote office has a supervisory unit for detecting trouble therein. When trouble is detected by the supervisory unit in a remote office, the state of the trouble is transferred through the corresponding data-transmitting line to the central office and is analyzed therein. If the analysis concludes that the trouble is serious, a maintenance operator is dispatched from the central office to the remote office to correct the problem.

Figure 2:
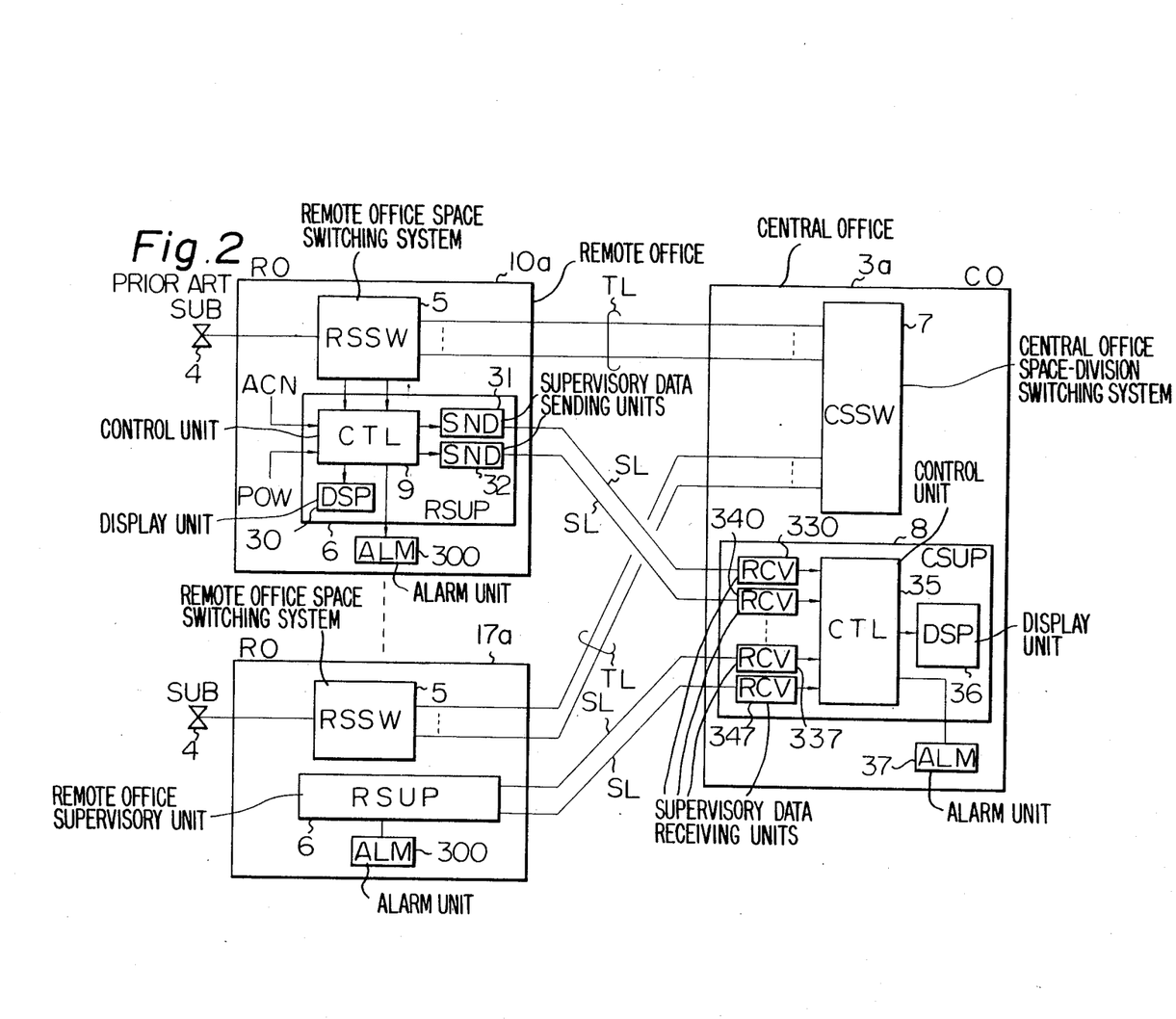
FIG. 2 is a block diagram of an example of a conventional centralized supervisory system.

An example of a conventional automatic switching system equipped with such a centralized supervisory system will now be described with reference to FIG. 2. In FIG. 2, notations 10a through 17a represent remote offices. Each of the remote offices is connected to, for example, a number of subscriber lines 4 or analog trunks. In the figure, for the purpose of simplicity, only a single subscriber line 4 and no analog trunk is illustrated for each remote office. Each remote office 10a, - - - , or 17a includes a remote-office space-division switching system (RSSW) 5 and a remote-office supervisory unit (RSUP) 6. Notation 3a represents a central office which includes a central-office space-division switching system (CSSW) 7 and a central supervisory unit (CSUP) 8. Each of the remote-office space-division switching systems 5 is connected through wired transmission lines TL to the central-office space-division switching system 7. The number of the transmission line TL connected to one remote-office space-division switching system 5 corresponds to the traffic thereof. One of the remote-office space-division switching systems 5 in one of the remote offices 10a through 17a can be connected through the transmission lines TL and the central-office space-division switching system 7 to another remote-office space-division switching system 5 in another remote office.

The remote-office supervisory unit 6 in each remote office includes a control unit (CTL) 9 which accumulates data regarding the operating states or the faulty states of the units in the remote-office space-division switching system 5 in the remote office, of the power-supply equipment (not shown), of the air-conditioning equipment (not shown), and so forth. The control unit 9 analyzes the accumulated data and produces supervisory data. The supervisory data are displayed on a display unit (DSP) 30. Alternatively, when trouble is caused, an alarm unit (ALM) 300 provided at a predetermined portion in the remote office is activated to attract the attention of any maintenance operator present in the remote office.

In most cases in the automatic switching system, however, there is no maintenance operator on duty in each remote office. When no maintenance operator is present, it is necessary to transfer the accumulated and analyzed supervisory data from each remote-office supervisory unit 6 to the central office 3a where a maintenance operator is present. For this purpose, each remote-office supervisory unit 6 has duplicate supervisory-data sending units (SND) 31 and 32; the centralized supervisory unit 8 in the central office 3a has a number of duplicate supervisory-data receiving units (RCV) 330 through 337 and 340 through 347; and a number of duplicate data-transferring lines SL for transferring the supervisory data are provided between the supervisory-data sending units and the supervisory-data receiving units, respectively. Each of the sending units 31 and 32 converts the supervisory data into data having a predetermined code format and sends the data to the corresponding data-transferring line SL. Each of the receiving units 330 through 337 and 340 through 347 receives the supervisory data from the corresponding sending unit through the data-transferring line SL and demodulates the received supervisory data. The centralized-supervisory unit 8 also comprises a control unit (CTL) 35 for controlling the accumulation and the analysis of supervisory data from each of the remote offices 10a through 17a and a display unit (DSP) 36 for displaying the acuumulated and analyzed supervisory data. Alternatively, when trouble is caused, an alarm unit (ALM) 37 in the central office is activated. Thus, the operating states or the trouble states of the units in all of the remote-office space-division switching systems 5, of the power-supply equipment, of the air-conditioning equipment, and so forth, in all of the remote offices 10a through 17a can be centrally supervised at the central office 3a.

Since the transfer of the supervisory data from the remote offices 10a through 17a to the central office 3a determines the reliability of this automatic switching system, the transfer of the supervisory data must be highly reliable. This is the reason for the duplicate data sending units 31 and 32, data-transferring lines SL, and data receiving lines 330 through 337 and 340 through 347.

Figure 3A:
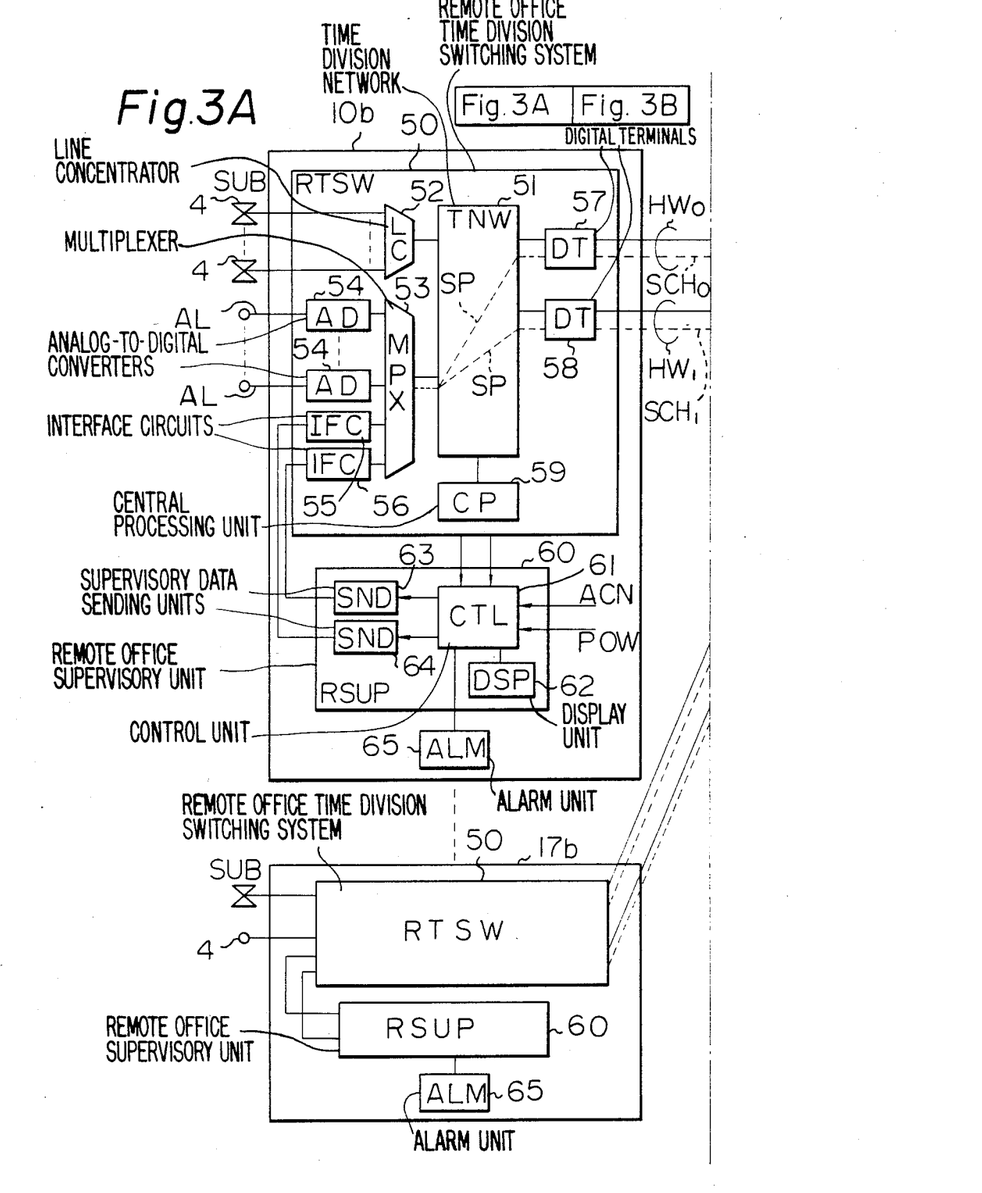
FIGS. 3A and 3B, are a block diagram illustrating a centralized supervisory system according to an embodiment of the present invention.
Figure 3B:
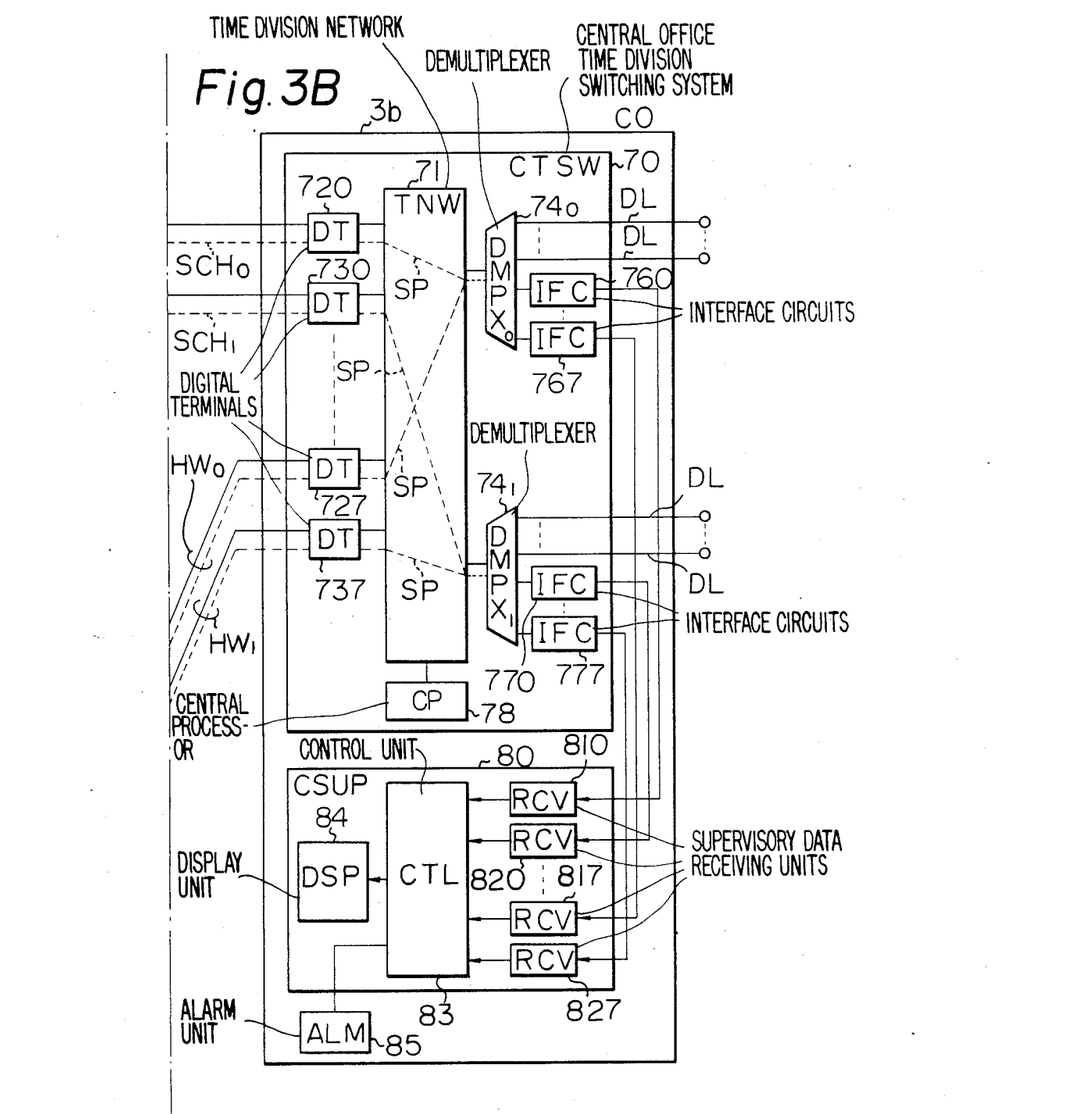

It is easy to use two of the transmission lines TL connected to one remote office for the lines SL for transferring the supervisory data. This is true even when an analog line is used instead of a number of wired transmission lines. When time-division switching systems are employed in place of space-division switching systems, however, it is not so easy to use some of the channels on the PCM multichannel as the supervisory-data transferring line. As mentioned before, the present invention is directed to the easy formation of supervisory-data transferring lines when time-division switching systems are employed. FIG. 3 is a block diagram of a centralized supervisory system in an automatic switching system according to an embodiment of the present invention. In FIG. 3, the centralized supervisory system comprises seven remote offices 10b through 17b and a central office 3b.

Each of the remote offices comprises a remote-office time-division switching system (RTSW) 50 and a remote-office supervisory unit (RSUP) 60. The remote-office time-division switching system 50 comprises a time-division network (TNW) 51, a line concentrator (LC) 52 connected between a number of subscriber lines 4 and the time-division network 51, a multiplexer (MPX) 53, a number of analog-to-digital (AD) converters 54, duplicate interface circuits (IFC) 55 and 56, duplicate digital terminals (DT) 57 and 58, and a central processing unit (CP) 59. The remote-office supervisory unit 60 comprises a control unit (CTL) 61, a display unit (DSP) 62, and duplicate supervisory-data sending units (SND) 63 and 64. The outputs of the supervisory-data sending units 63 and 64 are connected to the inputs of the interface circuits 55 and 56, respectively. The inputs of the AD converters 54 are connected to analog lines. The outputs of the AD converters 54 and of the interface circuits 55 and 56 are connected to the inputs of the multiplexer 53. The output of the multiplexer 53 is connected through a multichannel to an input of the time-division network 51. Similarly, the output of the line concentrator 52 is connected through another multichannel to another input of the time-division network 51. The remote-office supervisory unit 60 comprises duplicate supervisory-data sending units 63 and 64, a control unit (CTL) 61, a display unit (DSP) 62, and an alarm unit (ALM) 65.

The central office 3b comprises a central office time-division switching system (CTSW) 70 and a centralized supervisory unit (CSUP) 80. The central-office time-division switching system 70 comprises a central-office time-division network (TNW) 71, duplicate digital terminals (DT) 720 through 727 and 730 through 737, duplicate demultiplexers (DMPX$_0$, DMPX$_1$) 74$_0$ and 74$_1$, duplicate interface circuits (IFC) 760 through 767 and 770 through 777, and a central processing unit (CP) 78. The centralized supervisory unit 80 comprises duplicate supervisory-data receiving units 810 through 817 and 820 through 827, a control unit (CTL) 83, and a display unit (DSP) 84. An alarm unit (ALM) 85 in the central office 3b is connected to the control unit 83.

Each of the remote offices 10b through 17b is connected to the central office 3b by duplicate time-division digital highways HW$_0$ and HW$_1$ of a PCM multichannel. The duplicate system is employed for the purpose of increasing the reliability of this automatic switching system. Each time-division digital highway HW$_0$ or HW$_1$ is connected between one of the digital terminals in the remote offices and one of the digital terminals in the central office 3b.

Figures 4A, 4B:
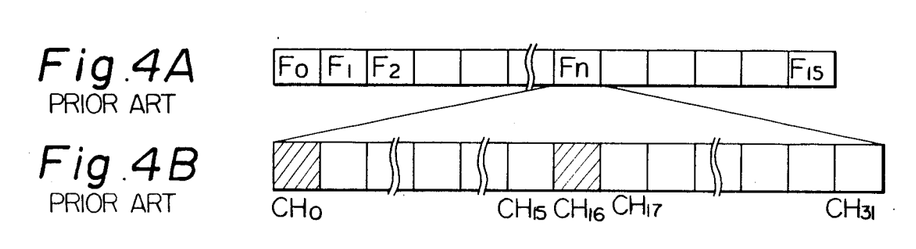
FIG. 4A is a data format of a multiframe signal of a PCM-30 system on a time-division digital highway of FIG. 3.
FIG. 4B is a data format of a multichannel in one frame of the multiframe of FIG. 4B.

An example of the data format on the time-division digital highway HW$_0$ or HW$_1$ is illustrated in FIGS. 4A and 4B. FIG. 4A shows a data format of a well known PCM-30 system developed by Nippon Telephone and Telegraph Public Corporation. In the PCM-30 system, 16 multiframes F$_0$ through F$_{15}$ are transmitted through each of the digital highways HW$_0$ and HW$_1$. One frame consists of 32 channels CH$_0$ through CH$_{31}$ as shown in FIG. 4B. Two predetermined channels CH$_0$ and CH$_{16}$ are reserved for detecting abnormalities of the digital highway or for signals between offices. Therefore, 30 channels can be used for communication in one frame. The time-division network 51 receives, from the line concentrator 52 and from the multiplexer 53, 30-channel multiplexed data. Under the control of the central processing unit 59 in the remote-office time-division switching system 50, the channels received by the time-division network 51 are divided from each other and switched to be allocated to desired channels on the time-division digital highways HW$_0$ and HW$_1$. Under the control of the central processing unit 78 in the central-office time-division switching system 70, the time-division network 71 switches the received data from the highways HW$_0$ and HW$_1$ so that calling subscriber lines 4 or calling analog lines are connected to terminating subscriber lines or other remote offices. This digital switching itself is well known.

In this embodiment of the present invention, in each time-division digital highway HW$_0$ or HW$_1$, a predetermined channel in each frame is allocated for transferring supervisory data. For this purpose, the multiplexer 53 in each of the remote offices 10b through 17b not only multiplexes the digital data received from the AD converters 54 which are connected to the analog lines AL, but also multiplexes, together with the above digital data, the supervisory data from the control unit 61 through the supervisory-data sending units 63 and 64 and through the interface circuits 55 and 56, so that, at the output of the multiplexer 53, two channels are allocated for the supervisory data. One of the two channels transfers the regular supervisory data from the interface circuit 55. The other channel transfers the standby supervisory data from the interface circuit 56.

Figure 5A:
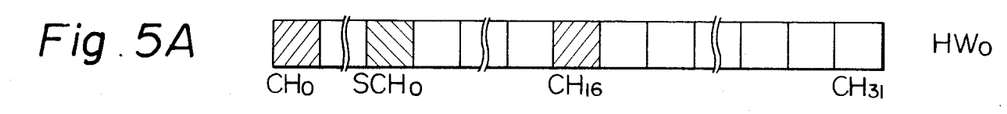
FIGS. 5A and 5B are data formats of a multichannel of FIG. 4B in which the supervisory data are allocated to predetermined channels.
Figure 5B:
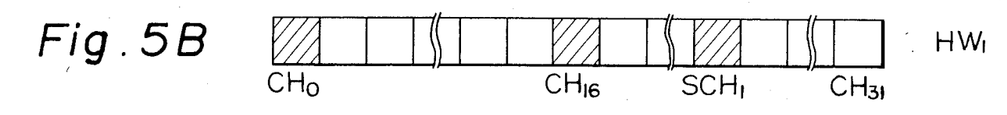

The output data of the multiplexer 53 is divided in time and switched by the time-division network 51. At this time, the central processing unit 59 controls the time-division network 51 so that, in each frame on each of the time-division digital highways HW$_0$ and HW$_1$, one or more predetermined channels are allocated for the supervisory data from the control unit 61. For example, as shown in FIG. 5A, the highway HW$_0$ includes a predetermined channel SCH$_0$ allocated for the supervisory data from the supervisory-data sending unit 63; and, as shown in FIG. 5B, the highway HW$_1$ includes another predetermined channel SCH$_1$ allocated for the supervisory data from the sending unit 64. These predetermined channels SCH$_0$ and SCH$_1$ are referred to as supervisory-data transferring channels and are represented by dotted lines in FIG. 3. To connect the outputs of the sending units 63 and 64 to the supervisory-data transferring channels, the central processing unit 59 forms or controls fixed speech paths SP in the time-division network 51. The speech paths SP are also expressed by dotted lines in FIG. 3. Even when trouble occurs in the central processing unit 59, most of the trouble will not relate to the control for setting the speech paths. Accordingly, the speech paths SP will hardly ever disappear.

In the central office 3b, the central processing unit 78 controls the time-division network 71 so that the channels on each digital highway HW$_0$ or HW$_1$ are divided from each other and switched. Thus, a calling subscriber line connected to the line concentrator 52 in, for example, the remote office 10b can be connected to a terminating subscriber line connected to, for example, the remote office 17b. A part of the communication data on the digital highways HW$_0$ and HW$_1$ and the supervisory data on the predetermined supervisory-data transferring channels SCH$_0$ and SCH$_1$ are input into the duplicate demultiplexers 74$_0$ and 74$_1$. The central processing unit 78 also forms or controls fixed speech paths SP between the supervisory-data transferring channels SCH$_0$ and SCH$_1$ and the demultiplexers 74$_0$ and 74$_1$. The demultiplexer 74$_0$ demultiplexes the received multichannel data into data of separate channels. The data for communication are transferred through 24 digital lines DL to other offices (not shown). The remaining eight channels are allocated for the supervisory data on the eight regular digital highways HW$_0$ connected to the eight remote offices 10b through 17b, respectively. Thus, the demultiplexer 74$_0$ provides the eight supervisory data to the eight interface circuits 760 through 767, respectively. Similarly, the standby demultiplexer 74$_1$ provides eight supervisory data from the eight standby digital highways HW$_1$ to the eight interface circuits 770 through 777.

Figure 6A:
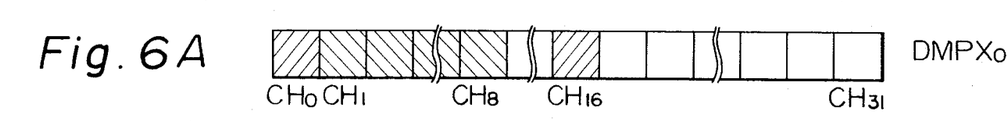
FIGS. 6A and 6B are data formats of the outputs of the central-office time-division network of FIG. 3.
Figure 6B:
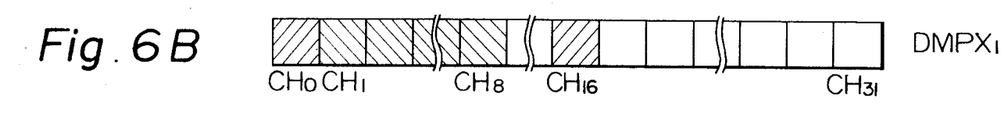

This will be more apparent from FIGS. 6A and 6B, which illustrate the outputs of the demultiplexers 74$_0$ and 74$_1$. As seen from FIG. 6A or 6B, the number of outputs of the demultiplexer 74$_0$ or 74$_1$ is 32, i.e., CH$_0$ through CH$_{31}$. Among the 32 outputs, eight outputs CH$_1$ through CH$_8$ are allocated for the supervisory data. The remaining outputs, except for the channel CH$_0$ and CH$_{16}$, are for the communication data. The channel CH$_0$ and CH$_{16}$ are reserved as mentioned before.

Thus, the supervisory-data sending units 63 and 64 in each remote-office supervisory unit 60 are connected to the corresponding pair of supervisory-data receiving units 810 and 820, 811 and 821, - - - , or 817 and 827, through the two data transferring paths formed by the interface circuits 55 and 56 in the remote-office time-division switching system 50, the fixed speech paths SP in the time-division network 51, the supervisory-data transferring channels $SCH_0$ and $SCH_1$ on the PCM multichannel time-division digital highways $HW_0$ and $HW_1$, the fixed speech paths SP in the time-division network 71 of the central-office time-division switching system 70, and the interface circuits 760 through 767 and 770 through 777. Each remote-office supervisory unit (RSUP) 60 can transfer the supervisory data, which represents the operating states or the trouble states of the remote-office time-division switching system 50, power-supply equipment, air-conditioning equipment and so forth in the remote office, to the centralized-supervisory unit 80. In the centralized-supervisory unit 80, the supervisory data, transferred through the above-mentioned two transferring paths, reach the control unit 83 through the supervisory-data receiving units 810 through 817 and 820 through 827. The control unit 83 controls the display unit 84 to continuously display the regular supervisory data received by the regular receiving units 810 through 817. When an error is detected in the regular supervisory data by the control unit 83, it switches the data from the regular supervisory data to the standby supervisory data received by the standby receiving units 820 through 827, so that the standby supervisory data are displayed. Alternatively, when serious trouble is detected, the alarm unit 85 is activated.

Figure 7:
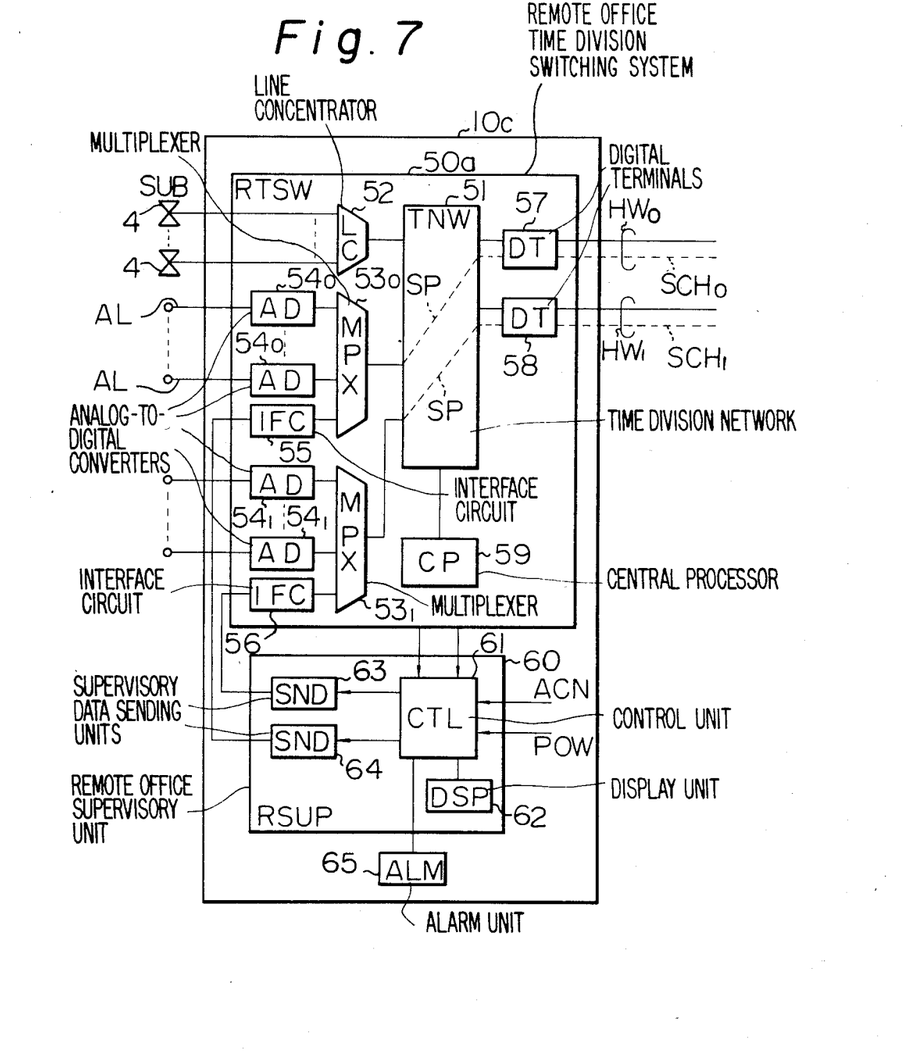
FIG. 7 is a block diagram of a remote-office time-division switching system according to another embodiment of the present invention.

Another embodiment of the present invention is illustrated in FIG. 7. In FIG. 7, a remote office 10c is illustrated. The difference between the remote office 10b in FIG. 3 and the remote office 10c in FIG. 7 is that, in place of a single multiplexer 53 in FIG. 3, two multiplexers $53_0$ and $53_1$ are employed in a remote-office time-division switching system 50a in FIG. 7. The supervisory-data sending units 63 and 64 are connected through the interface circuits 56 and 55 to the multiplexers $53_0$ and $53_1$, respectively. Each multiplexer $53_0$ or $53_1$ multiplexes the data from the AD converters $54_0$ or $54_1$ and the supervisory data from the supervisory-data sending unit 63 or 64, to provide a signal on a 30-multichannel line. Thus, the supervisory data from the supervisory-data sending unit 64 is transferred through the multiplexer $53_0$, and the supervisory data from the supervisory-data sending unit 63 is transferred through the multiplexer $53_1$. By this construction, the reliability of the duplicate system is higher than that in the system of FIG. 3.

The present invention is not restricted to the aforementioned and illustrated embodiments. Various changes and modifications are possible without departing from the spirit of the present invention. For example, the construction of the remote-office time-division switching system or the central-office time-division switching system may be different from the illustrated embodiments, as long as the fixed speech paths for supervisory data are allocated in the time-division network. Also, there are not necessarily two time-division digital highways connected between the remote offices and the central office, and there may be any number. Further, the construction of the remote-office supervisory unit or the central-supervisory unit is not restricted to the illustrated one. Various changes may be made without changing the effects of the present invention.

From the foregoing description, it will be apparent that, according to the present invention, data transmitting lines for transferring supervisory data can economically be realized in a centralized supervisory system employing time-division switching systems, by utilizing some of the channels on a time-division multiplexed line connected between a remote office and a central office.

We claim:

1. A centralized supervisory system in an automatic switching system, comprising:
   at least one remote office having a remote-office time-division switching system and a remote-office supervisory unit for supervising the system status of said remote-office time-division switching system;
   at least one first time-division multichannel line operatively connected to said at least one remote office, and having predetermined channels for transferring communication data representing voice signals;
   a central office having a central office time-division switching system connected through said at least one first time-division multichannel line to said at least one remote office, and a centralized supervisory unit for receiving supervisory data, representing at least the system status of said remote office, from said remote-office supervisory unit of said at least one remote office and for centrally supervising the received supervisory data, said central-office time-division switching system having predetermined output signal lines;
   first means, operatively connected to said remote office supervisory unit and said remote office time-division switching system, for allocating said supervisory data from said remote-office supervisory unit of said at least one remote office to one or more of the predetermined channels on said at least one first time-division multichannel line; and
   second means, operatively connected to said central office time-division switching system and said centralized supervisory unit, for connecting the predetermined output signal lines of said central-office time-division switching system to said centralized supervisory unit, the predetermined output signal lines transferring said supervisory data output from said central-office time-division switching system.

2. A centralized supervisory system as set forth in claim 1, wherein said first means is included in said remote-office time-division switching system of said at least one remote office, and said remote-office time-division switching system comprises:
   a first multiplexer, operatively connected to said remote office supervisory unit, for multiplexing the supervisory data from said remote-office supervisory unit with communication data to provide a multichannel with predetermined one or more channels being allocated for said supervisory data;
   a first time-division network, operatively connected to said multiplexer and said at least one first time-division multichannel line, for forming a desired speech path between said first multiplexer and said at least one first time-division multichannel line; and
   a central processing unit, operatively connected to said first time-division network, for controlling said first time-division network, so that said supervisory data are allocated to said predetermined channels on said first time-division multichannel line.

3. A centralized supervisory system as set forth in claim 2, wherein said second means is included in said central-office time-division switching system, and said central-office time-division switching system comprises:

a second time-division network, operatively connected to said first time-division multichannel line, for forming desired speech paths between said at least one first time-division multichannel line and the output of said second time-division network; and a demultiplexer, operatively connected to said second time-division network and to said centralized supervisory unit, for demultiplexing the output data from said second time-division network to provide said supervisory data to said centralized supervisory unit.

4. A centralized supervisory system as set forth in claim 3, further comprising:

a second time-division multichannel line separate from said first time-division multichannel line and connected between said first-time division network of said at least one remote office and said second time-division network of said central-office time-division switching system; and third means, operatively connected to said remote-office supervisory unit and said first time-division network, for allocating said supervisory data from said remote-office supervisory unit to one or more predetermined channels on said second time-division multichannel line, said second time-division network further forming desired speech paths between said second time-division multichannel line and the output of said second time-division network, said first time-division multichannel line being a regular time-division highway and said second time-division multichannel line being a standby time-division highway.

5. A centralized supervisory system as set forth in claim 4, wherein another speech path is formed between the output of said first multiplexer and said second time-division multichannel line by said first time division network.

6. A centralized supervisory system as set forth in claim 4, wherein said remote-office supervisory unit comprises means for providing regular supervisory data and standby supervisory data, and said third means comprises a second multiplexer, operatively connected between said remote-office supervisory unit and said first time-division network, said first multiplexer multiplexes said regular supervisory data with communication data, said second multiplexer multiplexes said standby supervisory data with communication data to provide a multichannel line with predetermined one or more channels being allocated for said standby supervisory data, a regular speech path is formed between the output of said first multiplexer and said first time-division multichannel line, and a standby speech path is formed between the output of said second multiplexer and said second time-division multichannel line.

7. A centralized supervisory system, comprising:

a remote supervisory unit producing remote supervisory data;

a multiplexer operatively connected to said remote supervisory unit and multiplexing the remote supervisory data with communication data, the communication data representing voice signals;

a remote time-division switching system operatively connected to said remote supervisory unit and the multiplexer, the remote supervisory data representing the operating state of said remote time-division switching system;

a time-division multichannel line, operatively connected to said remote time-division switching system, for carrying both the remote supervisory data and the communication data, where the remote supervisory data is carried by one or more channels;

a central time-division switching system operatively connected to said time-division multichannel line;

a demultiplexer operatively connected to said central time-division switching system and demultiplexing the remote supervisory data from the communication data; and a central supervisory unit operatively connected to said demultiplexer and monitoring the remote supervisory data and central supervisory data.

* * * * *

UNITED STATES PATENT AND TRADEMARK OFFICE
CERTIFICATE OF CORRECTION

PATENT NO. : 4,575,839
DATED : March 11, 1986
INVENTOR(S) : YUSUKE OGATA ET AL.

It is certified that error appears in the above-identified patent and that said Letters Patent is hereby corrected as shown below:

Col. 1, line 9, delete "of" (first occurrence).

Col. 2, line 40, "a block diagram" should be --block diagrams--.

Col. 3, line 26, "line" should be --lines--.

Col. 4, line 8, "acuumulated" should be --accumulated--.

Signed and Sealed this

Eighth Day of July 1986

[SEAL]

Attest:

DONALD J. QUIGG

Attesting Officer  Commissioner of Patents and Trademarks